United States Patent [19]

Keller et al.

[11] 4,029,124
[45] June 14, 1977

[54] POWER STEERING CONTROL VALVE

[75] Inventors: Manfred Keller, Schwaebisch Gmuend; Dieter Elser, Boegingen, both of Germany

[73] Assignee: Zahnradfabrik Friedrichshafen AG, Friedrichshafen, Germany

[22] Filed: May 9, 1975

[21] Appl. No.: 576,147

[52] U.S. Cl. .............................. 137/596.12; 91/434
[51] Int. Cl.² ........................................ F15B 13/14
[58] Field of Search .......................... 91/434, 370; 137/596.12; 180/132, 146

[56] References Cited

UNITED STATES PATENTS

| | | | |
|---|---|---|---|
| 2,362,945 | 11/1944 | Stephens | 137/596.12 |
| 2,865,339 | 12/1958 | Bishop | 91/434 |
| 2,919,681 | 1/1960 | Schultz | 137/596.12 X |
| 3,602,101 | 8/1971 | Jablonsky et al. | 91/434 X |

*Primary Examiner*—Irwin C. Cohen
*Attorney, Agent, or Firm*—Zalkind & Shuster

[57] ABSTRACT

There is disclosed a control valve arrangement for power steering systems having a servomotor piston which carries a piston valve constructed with a pair of reaction chambers having relief valves and communicating with each other in such a manner as to provide variable resistance against the manual force being applied to a steering wheel which actuates the piston valve. The purpose of thus effecting an automatically varying force is to impart to the vehicle driver a simulated sense of mechanical steering, i.e., simulated road resistance feel, but with a decreasing requirement of force expenditure during vehicle parking operations, or during low speed driving. The construction permits the use of simple parts in a very compact arrangement in which either reaction chamber imparts road resistance feel by being subjected only to servopump inlet pressure while the other is subjected to exhaust pressure. The unbalance of force acts on the piston valve in a direction opposite the manually impressed force. However, both reaction chambers have relief valves, biased closed, but exposed upstream to inlet pressure. Should that pressure exceed a certain limit, the reaction chamber under exhaust pressure will have an inlet pressure feed mixing with exhaust pressure to effect a force opposing the road resistance force of the other reaction chamber. Thus, manual steering effort during parking or driving at slow speeds is decreased even though servomotor pressure may increase.

12 Claims, 5 Drawing Figures

POWER STEERING CONTROL VALVE

The U.S. Pat. to Jablonsky No. 3,602,101 issued Aug. 31, 1971 is incorporated herein by reference.

In the prior art there are power steering control valves, for example, the German published application 2 121 002 shows an inherent disadvantage in that large, steering movements, for example, in parking or when going at low speeds, produce a need for larger manual force on the part of the driver, a condition which is precisely the opposite of that which is desirable. In another prior art arrangement, as shown in German Pat. No. 1 238 789, means are provided for limiting the need for manual force increase by turning off the reaction force which is normally present to give the driver a sense of road resistance. This requires an additional mechanism involving differential pistons operating as valves which require considerable space in the valve control mechanism and is not feasible in modern steering arrangement wherein the mechanism has only a small space available for all parts and their movements.

Briefly, the present invention utilizes a compact structure wherein the entire servomotor control comprises a piston valve, the ends of which are open to effect cylinders utilized as reaction chambers. Relatively stationary pistons, in the sense that they are secured to the servomotor piston as by bolts, protrude into respective reaction chambers. Each of the reaction chambers is for a respective direction of steering and the respective reaction piston is provided with a spring biased relief valve which when open establishes communication for inlet pressure to the respective reaction chamber. Communication between the reaction chambers and various pressure and exhaust passages directly or indirectly controlled by the piston valve is such that pressure against the relief valve of one reaction chamber connected to a working servomotor chamber is balanced while pressure on the relief valve of the other reaction chamber is exhaust pressure in the closing direction but inlet pressure in the opening direction.

Accordingly, should inlet pressure rise beyond the closing bias force on the latter relief valve, the relief valve will open to effect mixing of inlet and outlet pressure in the respective reaction chamber. The net force then provides pressure acting on the piston valve in a direction opposing the road resistance force produced by the other reaction chamber.

Certain of the passages referred to are restricted flow throttle bores which are advantageous in effecting smooth and controlled operation of the system.

A detailed description of the invention now follows in conjunction with the appended drawing in which all illustrations are partial radial sections:

Figure 1:
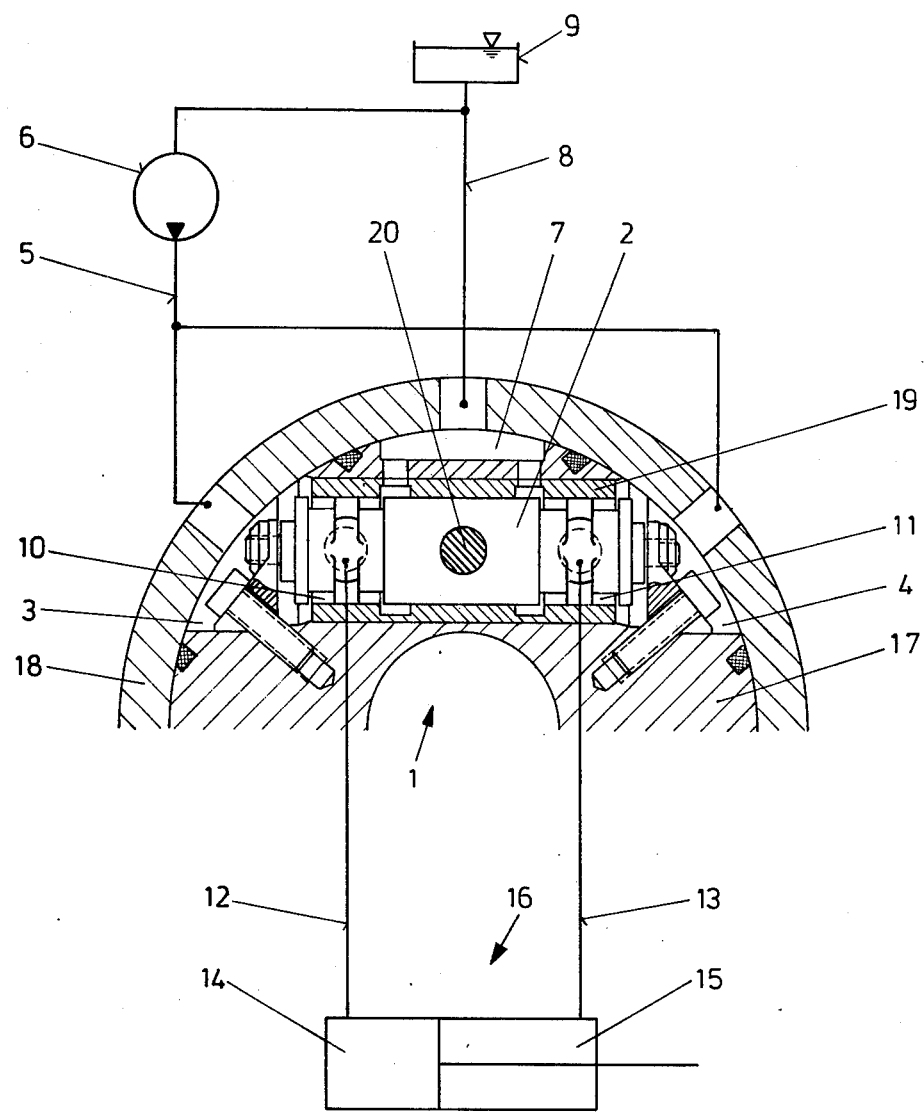
FIG. 1 shows the essential components of the invention also illustrating the servomotor cylinder and piston with the control valve mounted thereon and various conventional elements of a power steering system depicted.

Referring now to FIG. 1, the control valve 1 is illustrated disposed in a power steering mechanism having inlet chambers 3 and 4 adjacent the ends of control piston valve 2 and connecting by line 5 with the servopump 6. A centrally disposed exhaust or return groove 7 passes longitudinally in the servomotor piston surface so that as to continually connect via line 8 with the sump 9. By a cross connection as shown, it will be noted that the inlet chambers 3 and 4 continually connect with pressure feed from the servopump 6.

The control piston valve 2 is provided with annular grooves 10 and 11 connecting by respective lines 12 and 13 with double acting servomotor 16 having pressure chambers 14 and 15 and which will be understood to operate a steering linkage system.

Various conventional and non-essential components have been omitted for purposes of clarity since they do not relate to the construction and function of the specific invention.

As will be noted, the overall construction is very compact, by providing control valve 1 housed within a chordal bore of the servomotor piston 17 which in turn is carried slidably within the steering mechanism housing 18.

The control piston valve 2 is slidable in a sleeve 19 fixed within the chordal bore and actuated as by a steering spindle pin 20 by being shifted in a direction corresponding to a desired direction of steering.

Figure 2:
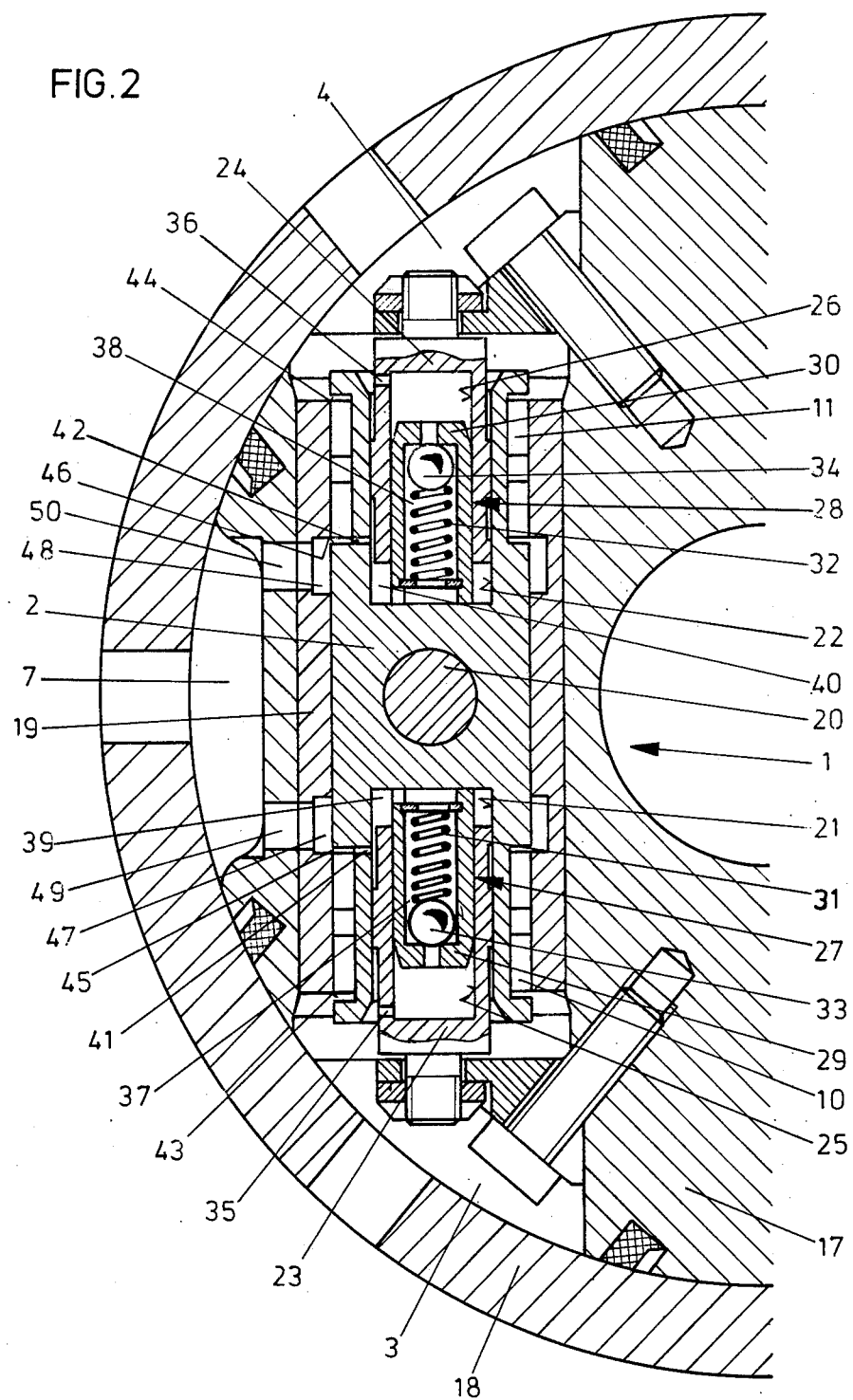
FIG. 2 illustrates in greater detail one form of control valve and the reaction chambers associated therewith.

The description thus far given merely sets forth the general arrangement of elements for which a more detailed description of the invention is set forth in conjunction with FIG. 2 wherein like reference characters refer to components heretofore described. Various components normally present in systems of this kind, such as pressure regulation valves, suction valves, mechanical linkages, etc. are omitted as being unnecessary for purposes of this disclosure.

In FIG. 2 there is disclosed in each end of the piston valve 2 a bore to effect a respective reaction cylinder, these being the bores 21 and 22 in which are shown, as fixed with suitable bolts to the servomotor piston 17, reaction pistons 23 and 24. The reaction pistons have a sliding fit within the bores and guidance in operation, acting like pistons in conjunction with respective bores 21 and 22 although cylindrical in shape and relatively stationary with respect to piston valve 2, i.e., fixed pistons.

The fixed pistons 23 and 24 are respective components which in conjunction with bores 21 and 22 effect closure to achieve reaction chambers 39 and 40 to produce reaction force corresponding to the degree of bidirectional steering force applied to spindle pin 20 in shifting control piston valve 2 in steering to the left or right. Each of the fixed pistons 23 and 24 is provided with a respective relief valve, valves 27 and 28, disposed in the open ends of respective bores 25 and 26 of the fixed pistons. In this instance the relief valves comprise cylindrical housings 29 and 30 for respective ball valves 33 and 34 biased by respective springs 32 and 33 in the respective interiors 37 and 38 of housings 29 and 30 to closed position against seat bores shown in the ends of the respective housings as will be clear from FIG. 2. Slits or apertures, or the like, are provided in the housings 29 and 30 to permit flow to a respective reaction chamber should a relief valve ball open during operation.

The inlet sides of the relief valves 27 and 28 communicate downstream with inlet pressure in chambers 3 and 4 through respective throttling bores 35 and 36 whereby inlet pressure is fed to the relief valves in the opening direction against the respective biasing springs, such inlet pressure being present within the respective fixed pistons 23 and 24. Thus, the respective interiors 37 and 38 of the relief valve housings communicate with respective reaction chambers 39 and 40 which are connected with the respective annular grooves 10 and 11 on the exterior of piston valve 2 via the respective throttling bores 41 and 42.

As will be noted in FIG. 2, when piston 2 is centrally disposed for neutral steering the grooves 10 and 11 respectively connected with the respective inlet chambers 3 and 4 via open gaps at respective control edges 43 and 44 and also are connected via open gaps at respective exhaust control edges 45 and 46. When the gaps at these latter edges are open there is communication to the return groove 7 via respective annular grooves 47 and 48 provided in the interior surface of sleeve 19 and via the respective bores 49 and 50 which connect to return groove 7.

It will be noted that the entire construction is symmetrical and when the vehicle is steering straight ahead with valve piston 2 in neutral or central position as shown in FIG. 2 there is circulatory flow from servopump to the sump as will be readily apparent.

It will also be noted that during normal steering, e.g., piston valve 2 moved downwardly (as viewed on FIG. 4,) reaction chamber 39 connects with inlet chamber 3 via throttling bore 41, annular groove 10 and the open gap at edge 43 while the other reaction chamber 40 communicates with return groove 7 via the throttling bore 42, annular groove 11, the open gap at edge 46, the annular groove 48 and bore 50. Thus, there is a pressure difference between the reaction chambers 39 and 40 acting on piston valve 2 which results in a simulated road resistance or reaction force directed against piston valve 2 which is opposite to the deflection or shifting movement exerted manually thereon by the steering spindle pin 20. This is the simulated steering resistance which the vehicle driver feels. This difference in pressure in the reaction chambers results from the pressurizing of one such chamber in a direction determined by the direction of shift of the piston while the other chamber is being exhausted.

Figure 4:
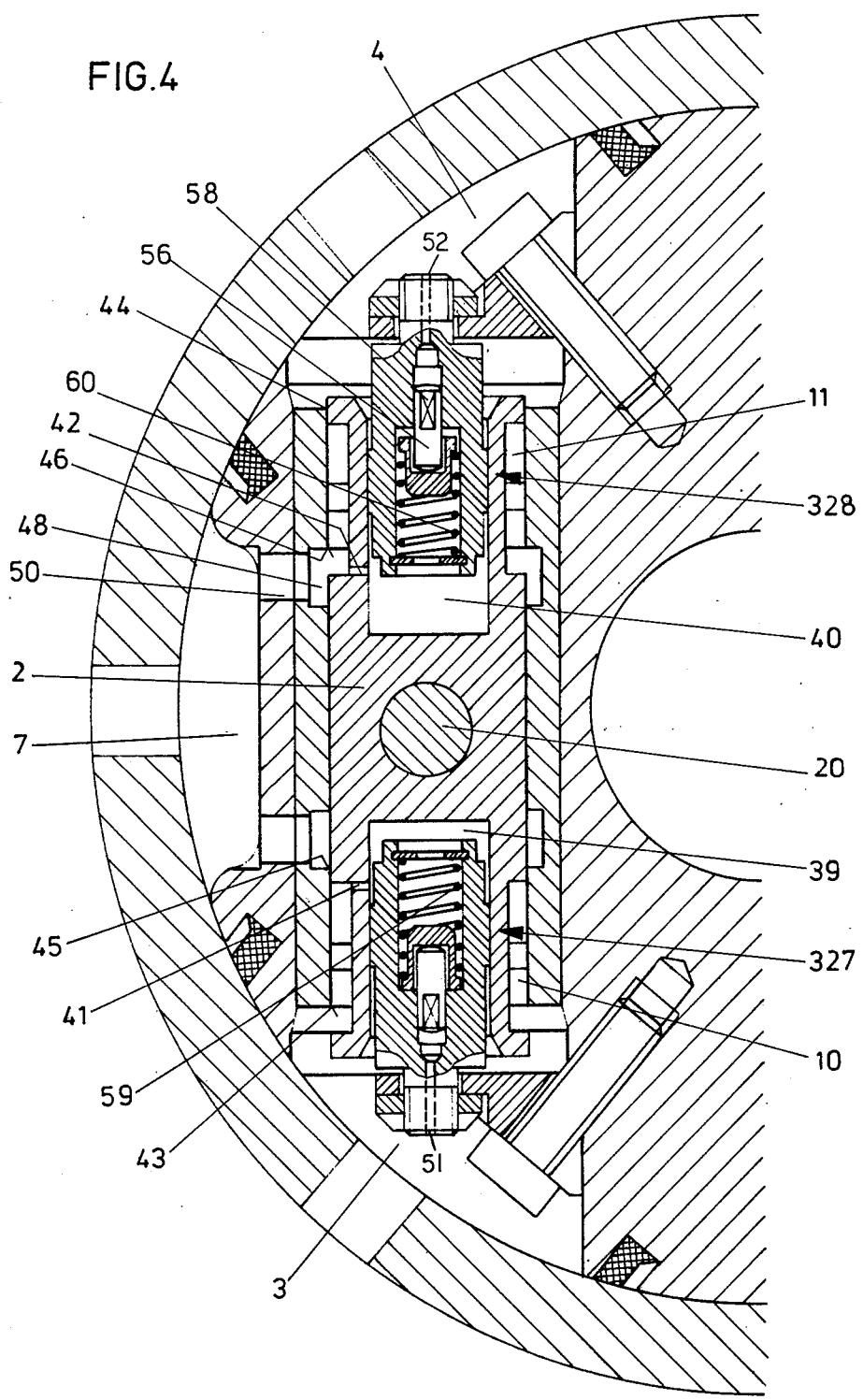
FIG. 4 illustrates an actuated position of the mechanism shown in FIG. 3.

During steering at usual road speeds, inlet pressure exists on both relief valves in the opening direction, as will be apparent from the preceding description and also by reference to FIG. 4 at this time which illustrates the piston valve 2 in a steering position.

If, however, the pressure becomes too great on either relief valve due to hard steering forces being applied, then that relief valve will open with certain effects which will be explained in conjunction with FIG. 4, the modification of FIGS. 2 and 3 herein functioning in the same manner.

Figure 3:
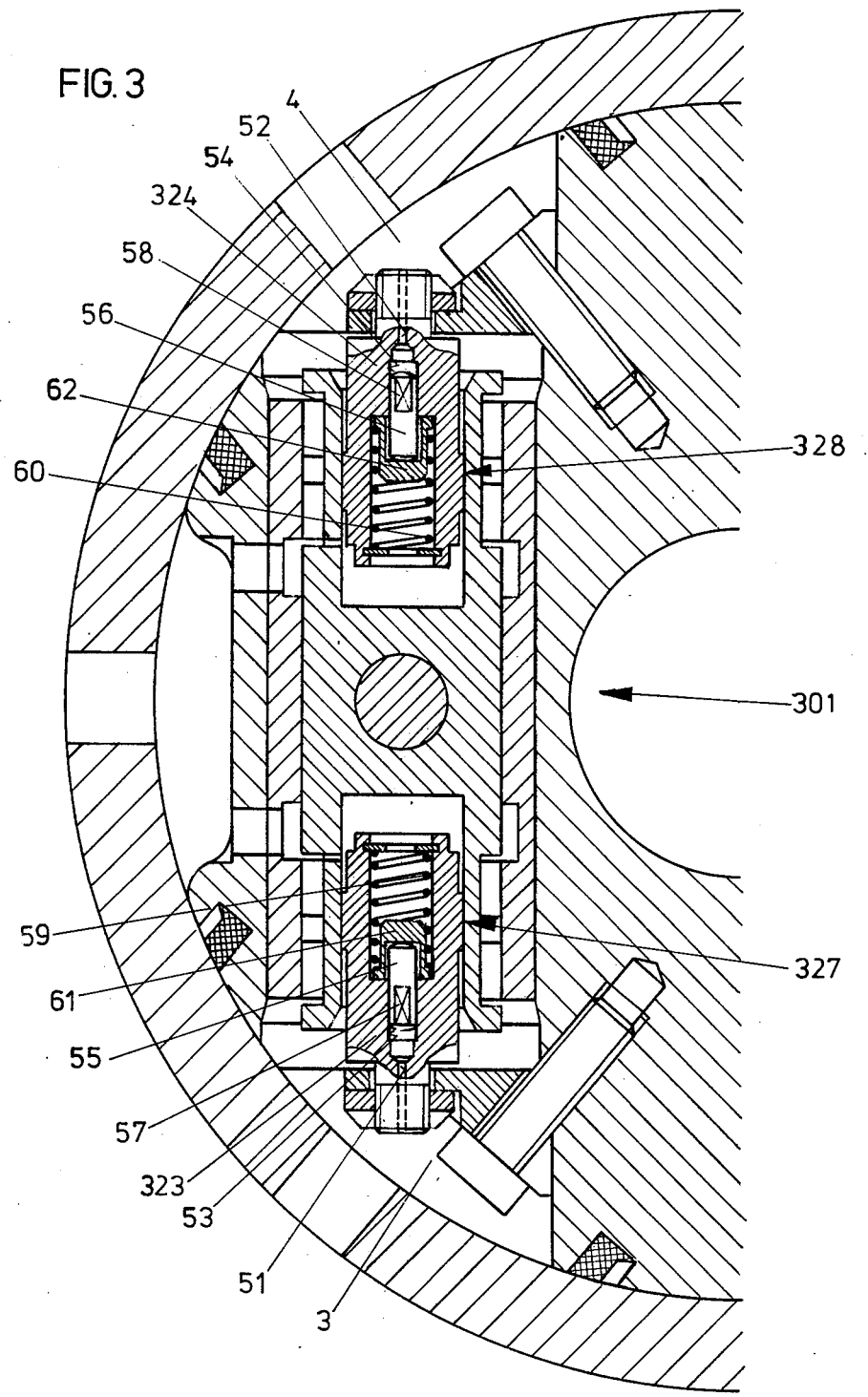
FIG. 3 illustrates a modified form of the invention utilizing a different type of relief valve for the reaction chambers.

Referring now to FIG. 3, the control piston valve 302 comprises a modified relief valve arrangement in the form of valves 327 and 328 which comprise respective pistons 55 and 56 disposed in respective axial bores 53 and 54 of the respective reaction pistons 323 and 324. The bores 53 and 54 connect with respective inlet chambers 3 and 4 through respective throttling bores 51 and 52. The pistons 55 and 56 have respective throttling flow control surfaces 57 and 58 which may be channels or flats in the cylindrical surfaces of the respective pistons. The pistons 55 and 56 abut in the bottoms of respective spring retainer cups 61 and 62 having flanges engaging respective biasing springs 59 and 60 which maintain the flow control channels 57 and 58 in slow stopping position. It will be noted that should either relief valve piston 55 or 56 be moved inwardly, the respective flow control channel 57 or 58, passing beyond an edge E of the bore in which that piston is guided, will effect communication from the respective inlet chamber 3 or 4 to the return groove 7 but increase pressure in the respective reaction chamber 39 or 40 due to inlet pressure feed to such reaction chamber. This communication takes place through inlet and outlet throttling valves shown in FIG. 3 and as described in conjunction with FIG. 2 and is further illustrated in FIG. 4 wherein like reference characters as found in the preceding Figures denote like parts.

In explanation of operation, particularly with reference to FIG. 4, pin 20 has moved to cause shifting of piston valve 2 in the downward direction shown. Inlet chamber 3 communicates with servomotor chamber 14 through the open gap at edge 43, annular groove 10 and line 12. Simultaneously servomotor chamber 15 communicates with return groove 7 via line 13, annular groove 11, the open gap at edge 46, annular groove 48 and bore 50. The flow control edge 44 from the inlet chamber controlling feed pressure and the control edge 45 controlling return flow are now closed.

At this time reaction chamber 39 communicates with inlet chamber 3 through throttling bore 41, annular groove 10, and the open gap at edge 43. Reaction chamber 40 communicates with return groove 7 via throttling bore 42, annular groove 11, the open gap at edge 46, annular groove 48 and bore 50. Accordingly, feed pressure is in reaction chamber 39 and exhaust pressure in in reaction chamber 40. The unbalance of pressure force acts in against the manual force of downward movement on pin 20.

Thus, exhaust pressure in groove 7 exists on the downstream side of relief valve 328 while feed pressure exists on the downstream side of relief valve 327 as well as on the upstream side of both relief valves, it being noted that these feed pressures are all equal since the pressure in chambers 3 and 4 are equal. Since the reaction pistons are relatively fixed, the net force on piston valve 2 is upward, i.e., the higher inlet pressure in reaction chamber 39 acts against the lower exhaust pressure in chamber 40, thus against the manual force on pin. 20.

Now, should the power assist servopump pressure exceed a level predetermined by either of the relief valve springs, the relief valve exposed thereto will be shifted to communicate flow to its respective reaction chamber. Thus, assuming the actuated condition shown in FIG. 4 and a higher than predetermined pressure existing against piston valve 56 from inlet chamber 4, that piston will shift against spring 60 causing flow via the channel 58 communicating inlet pressure to the return groove 7 through the reaction chamber 40 downstream of the relief valve piston. It will be noted that all such flow takes place not only through respective inlet and outlet throttling bores 52, 42, but also the relief valve channel 58 likewise has a throttling effect. The result is a mixed but increased pressure in reaction chamber 40 acting against the pressure in the reaction chamber 39. Accordingly, while during normal steering operation the road resistance effect will build up with increasing operating pressure in either of the servomotor cylinder chambers, should that pressure become too high, as in parking, the appropriate relief valve, in this case valve 328, will bypass throttled flow and produce a net force which opposes simulated road resistance force of the other reaction chamber 39.

It will be apparent that a control valve of the invention can be designed for any particular conditions by selection of the diameters of the throttling bores, or channels, shown in any of the modifications thus far described as well as the dimensions of the movable parts and spring strength. Thus, an upper limit or road resistance effect can be achieved if desired or a slight rise of such effect above the opening point of one of the relief valves.

From the above description it will be understood that in the event of shifting of piston valve 2 in a direction to that opposite the direction shown in FIG. 4 precisely the opposite flow effects take place with opposite counteracting force. This, of course, holds true for the form of the invention described in FIG. 2.

Figure 5:
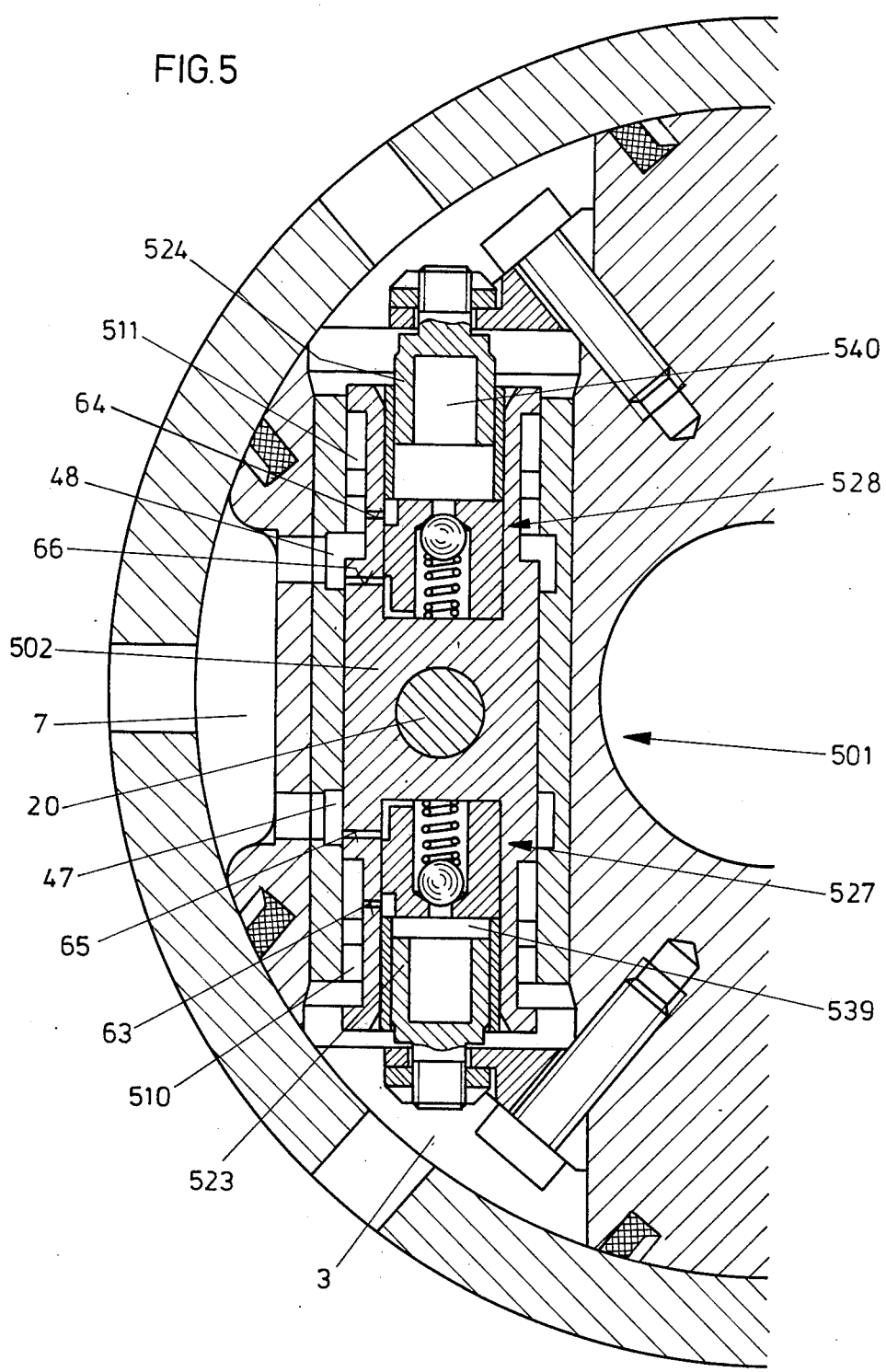
FIG. 5 shows a further modification of the relief valving and the reaction chambers.

Referring now to FIG. 5, a further modification is shown wherein the control valve 501 comprising relief valves 527 and 528 are disclosed between reaction chambers 539 and 540 and return groove 7 in control piston valve 502. The reaction chambers are defined, on the one hand, by the respective relief valves and on the other hand by the reaction pistons, that is, the fixed pistons 523 and 524, respectively, which are seen to close off the chambers into the necessary isolated regions. The external machining of valve piston 502 is such that the chambers are provided with respective external grooves 510 and 511 which communicate with respective chambers through throttling bores 63 and 64. The discharge or downstream sides of the relief valves communicate via annular grooves 47 and 48 internally machined into the valve piston sleeve as shown to effect flow via bores as shown to return groove 7, such return flow being via respective throttling bores 65 and 66.

Upon shifting of valve piston 502 in either direction, for example the direction shown in FIG. 5, downward as viewed on the drawing, the reaction chamber 539 communicates with inlet chamber 3 via throttling bore 63 and groove 510. At this time reaction chamber 540 communicates with return groove 7 via throttling bore 64 and annular groove 511. The pressure difference resulting effects a force on steering spindle pin 20 which is opposite to the downward steering movement of the pin 20. This, of course, effects the road resistance feel.

Should a predetermined operating pressure level be exceeded in reaction chamber 539 as controlled by relief valve 527, that relief valve opens to reduce the simulated road resistance force on piston valve 502 in a manner understood from the preceding explanation of operation of FIG. 4. Thus, in the event of hard steering, no consequent hard road resistance feel is caused. In view of the symmetry of the arrangement should piston valve 502 be moved in the opposite direction the exactly opposite effect will be achieved.

From the above description of the various modifications it will be apparent that a common design for all modifications, except for the specific relief valving, results in a very compact construction and it will further be noted that there is an additional advantage by way of utilization of the several throttling bores which have a damping effect on flow and effectively reduce vibration. Moreover, by predeterminable design of the inlet and return throttling bores of the various modifications complete or partial limitation of road resistance feel above a certain value is rendered possible.

What is claimed is:

1. A power steering control valve for servopump and double acting servomotor systems, comprising:
    a piston valve (2) and means (20) for manually and bidirectionally shifting said piston valve under control of a vehicle driver;
    a housing means (17, 18, 19) for said piston valve;
    said piston valve having ends and said piston valve and housing means having relatively high pressure inlet means (4) wherein the ends of said piston valve are constantly exposed to inlet pressure;
    said piston valve and housing means having relatively low outlet pressure return means (7) and having coacting flow control and return passage elements (47, 49) (48, 50) including passages (12, 13) whereby a shifted position of said piston valve in a respective direction directs high inlet pressure to a respective chamber of a double acting servomotor cylinder while exhausting low outlet pressure from the opposite chamber;
    means defining reaction chambers (39, 40) at each end of said piston valve;
    said reaction chambers having respective relief valves (27, 28) (327, 328) constantly exposed to inlet pressure and openable at a predetermined rise in inlet pressure;
    means (4, 7, 10, 11, 41, 42, 51, 52, 55, 56) whereby said piston valve in shifted position is subjected to opposing pressures in said reaction chambers to effect steering resistance by unbalance of forces on said piston valve;
    said means comprising passages (41, 42, 51, 52) for inlet and outlet pressure flow to said reaction chambers to effect said unbalance of forces in said shifted position of said piston valve by mixing of inlet and outlet pressures in either reaction chamber acting against said piston valve at one end upon opening of the respective relief valve, to act against opposed inlet pressure in the other reaction chamber acting against the other end of said piston valve;
    said passages (41, 42, 51, 52) comprising for each reaction chamber a restricted bore communicating between said inlet means and said reaction chamber and also having a restricted bore communicating between said reaction chamber and said return means, said bores effecting flow throttle passages.

2. A power steering control valve for servopump and double acting servomotor systems as set forth in claim 1,
    said reaction chambers each comprising a bore in each end of said piston valve wherein said piston valve has opposed pressure receiving surfaces.

3. A power steering control valve for servopump and double acting servomotor systems as set forth in claim 1,
    each reaction chamber having a respective reaction piston carried by said housing means and extending into a respective reaction chamber and having a slidable fit therein whereby movement of said piston valve is relative to respective reaction pistons effecting closure of respective reaction chambers.

4. A power steering control valve for servopump and double acting servomotor systems as set forth in claim 1, said reaction chambers each comprising a bore in each end of said piston valve wherein said piston valve has opposed pressure receiving surfaces;

each reaction chamber having a respective reaction piston carried by said housing means and extending into a respective reaction chamber and having a slidable fit therein whereby movement of said piston valve is relative to respective reaction pistons effecting closure of respective reaction chambers.

5. A power steering control valve for servopump and double acting servomotor systems as set forth in claim 1, said passages comprising for each reaction chamber a restricted bore communicating between said inlet means and said reaction chamber and also having a restricted bore communicating between said reaction chamber and said return means, said bores effecting flow throttle passages;

each reaction chamber having a respective reaction piston carried by said housing means and extending into a respective reaction chamber and having a slidable fit therein whereby movement of said piston valve is relative to respective reaction pistons effecting closure of respective reaction chambers.

6. A power steering control valve for servopump and double acting servomotor systems as set forth in claim 1, said reaction chambers each comprising a bore in each end of said piston valve wherein said piston valve has opposed pressure receiving surfaces;

said passages comprising for each reaction chamber a restricted bore communicating between said inlet means and said reaction chamber and also having a restricted bore communicating between said reaction chamber and said return means, said bores effecting flow throttle passages;

each reaction chamber having a respective reaction piston carried by said housing means and extending into a respective reaction chamber and having a slidable fit therein whereby movement of said piston valve is relative to respective reaction pistons effecting closure of respective reaction chambers.

7. A power steering control valve for servopump and double acting servomotor systems as set forth in claim 1, wherein each said reaction chamber has said respective relief valve openable by a predetermined inlet pressure on its upstream side through one said respective restricted bore for effecting inlet pressure flow to the downstream side to be conducted from the respective reaction chamber via said restricted bore.

8. A power steering control valve for servopump and double acting servomotor systems as set forth in claim 1, each reaction chamber having a respective reaction piston (23, 24) carried by said housing means (17, 18, 19) and extending into a respective reaction chamber (39, 40) and having a slidable fit therein whereby movement of said piston valve is relative to respective reaction pistons effecting closure of respective reaction chambers, said relief valves (27, 28) being carried in respective reaction pistons.

9. A power steering control valve for servopump and double acting servomotor systems as set forth in claim 1, wherein said coacting flow control inlet and return passage elements comprise grooves and lands of said housing means and said piston valve effecting open passages in a neutral position of said piston valve for communicating inlet passage pressure to the upstream sides of said relief valves and return passage pressure to said reaction chambers whereby shifting of said piston valve establishes selective relief valve and reacting chamber flow control.

10. A power steering control valve for servopump and double acting servomotor systems as set forth in claim 1, said relief valves comprising a respective ball valve including bias means therefore and biased to closed position for each reaction chamber.

11. A power steering control valve for servopump and double acting servomotor systems as set forth in claim 1, said relief valves comprising a respective piston valve including biased means therefore and biased to closed position for each reaction chamber and having a restricted flow channel to conduct flow when open.

12. A power steering control valve for servopump and double acting servomotor systems as set forth in claim 1, said relief valves being carried in respective reaction chamber piston valve bores and movable with said piston valve;

said reaction chambers each comprising a bore in each end of said piston valve wherein said piston valve has opposed pressure receiving surfaces.

* * * * *